United States Patent

[11] 3,591,708

[72] Inventor Masayoshi Hirashima
Takatsuki-shi, Japan

[21] Appl. No. 807,591
[22] Filed Mar. 17, 1969
[45] Patented July 6, 1971
[73] Assignee Matsurhita Electric Industrial Co., Ltd.
Osaka, Japan
[32] Priority Mar. 22, 1968, Apr. 12, 1968, June 25, 1968, June 27, 1968, Dec. 26, 1968, Dec. 26, 1968
[33] Japan
[31] 43/19282, 43/25107, 43/44734, 43/45252, 43/994 and 43/995

[54] COLOR TELEVISION RECEIVER
10 Claims, 21 Drawing Figs.

[52] U.S. Cl. .... 178/5.4 R, 178/DIG. 15
[51] Int. Cl. .... H04n 9/12
[50] Field of Search .... 178/5.4, 5.2; 325/31, 455

[56] References Cited

UNITED STATES PATENTS

| | | | |
|---|---|---|---|
| 3,287,494 | 11/1966 | Spies et al. | 178/5.4 |
| 3,482,166 | 12/1969 | Gleason | 325/31 X |
| 3,503,018 | 3/1970 | Cavanagh | 325/455 X |

*Primary Examiner*—Richard Murray
*Attorney*—Stevens, Davis, Miller and Mosher

ABSTRACT: A color television receiver, wherein a tuner is adapted to successively receive different broadcast waves under the control of a control voltage of stepped waveform, switching elements are successively rendered conductive for a predetermined period by a logical product of a signal resulting from detecting as to whether the broadcast stations are transmitting color programs or black-and-white programs, said switching elements corresponding in number to the broadcast waves so that indicator means connected with the respective switching elements are energized, thereby indicating whether the broadcast stations are transmitting color programs or black-and-white programs.

INVENTOR
MASAYOSHI HIRASHIMA
BY Stevens, Davis, Miller & Mosher
ATTORNEYS

INVENTOR
MASAYOSHI HIRASHIMA

BY

ATTORNEYS

INVENTOR

MASAYOSHI HIRASHIMA

BY

ATTORNEYS

INVENTOR
MASAYOSHI HIRASHIMA

BY

ATTORNEYS

INVENTOR

MASAYOSHI HIRASHIMA

BY

ATTORNEYS

INVENTOR
MASAYOSHI HIRASHIMA

BY

ATTORNEYS

INVENTOR
MASAYOSHI HIRASHIMA

BY

ATTORNEYS

INVENTOR

MASAYOSHI HIRASHIMA

BY

ATTORNEYS

COLOR TELEVISION RECEIVER

This invention relates to a color television receiver.

In the conventional color television receivers, either there is provided no means for indicating color broadcast or provision is merely made for means for indicating whether a presently received broadcast signal represents a color program or not. With the latter means, however, it is impossible to determine whether other broadcast waves than the present received one represent color programs or black-and-white programs.

Accordingly, it is a primary object of the present invention to make it possible to produce display of all broadcast waves as to whether they represent color programs or black-and-white programs.

Another object of the present invention is to construct the means adapted to achieve the foregoing object by providing a separate tuner in addition to the tuner originally provided in the receiver.

Still another object of the present invention is to simplify the aforementioned means by making use of the tuner originally provided in the receiver.

A further object of the present invention is to provide the desired indication not momentarily but all the time.

A further object of the present invention is to economically produce the desired display.

A still further object of the present invention is to provide means of the aforementioned type which can be economically and easily combined with a receiver.

Other objects, features and advantages of the present invention will become apparent from the following description taken in conjunction with the accompanying drawings, in which.

Figure 6:
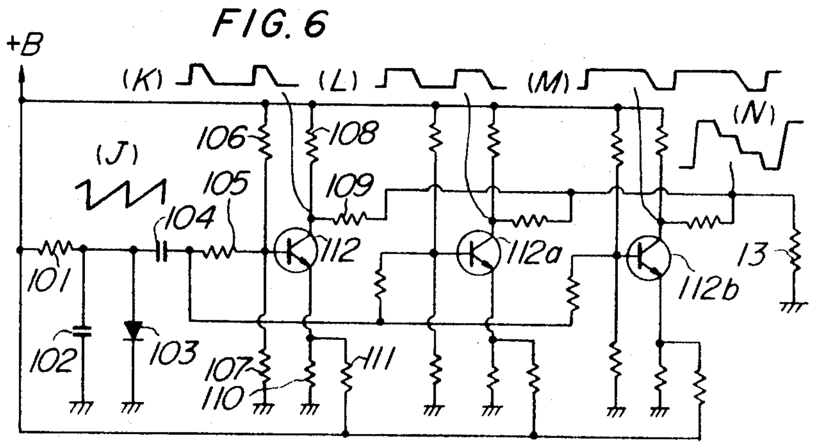
Figures 7, 8:
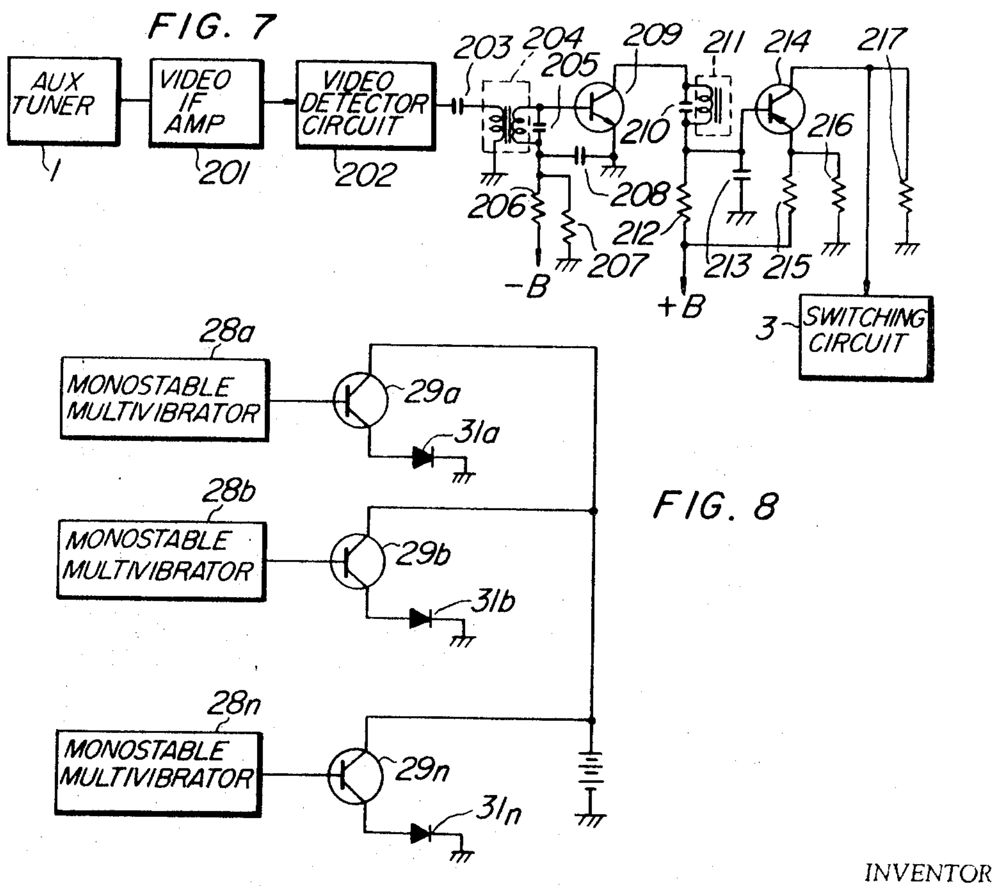
Figure 9:
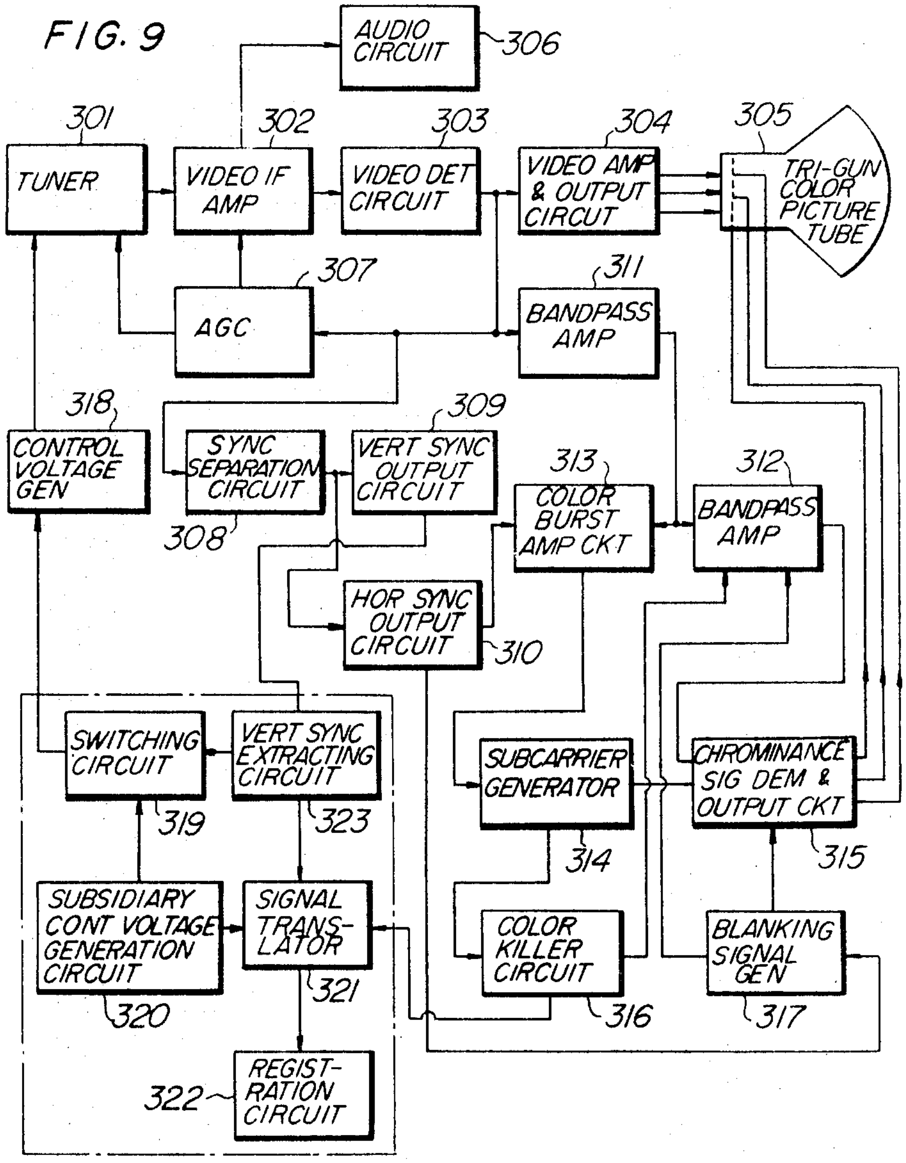
Figure 10A:
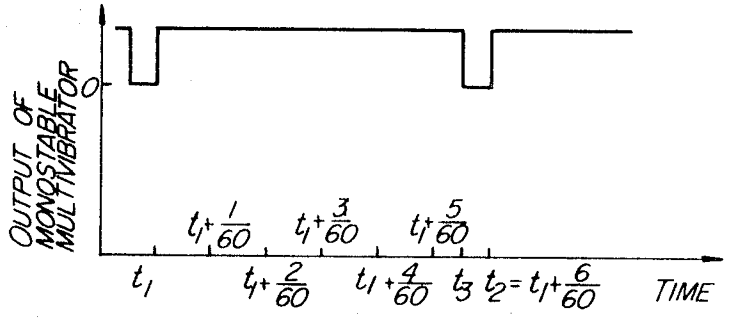
Figure 10B:
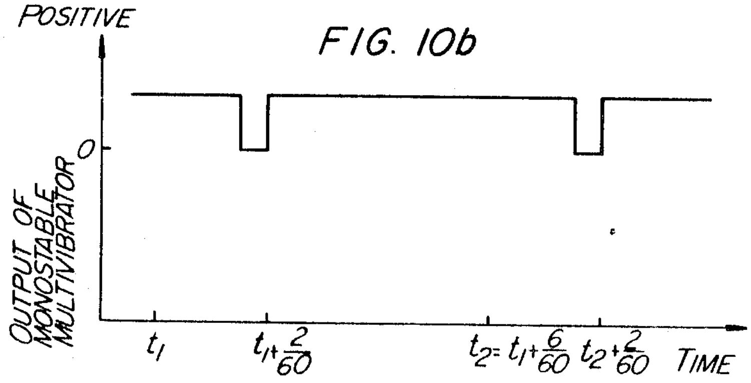
Figure 10C:
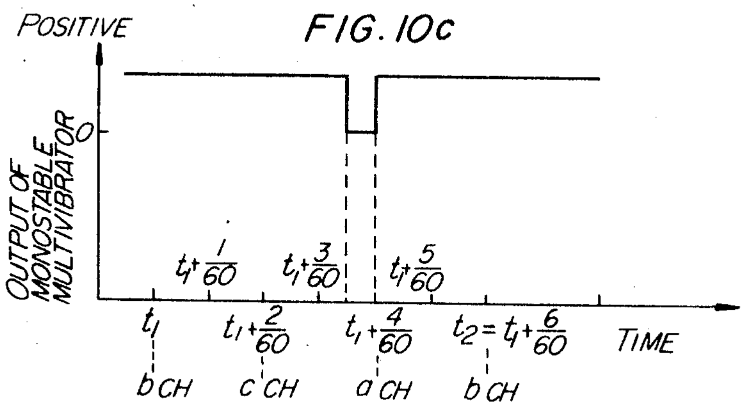
Figure 11:
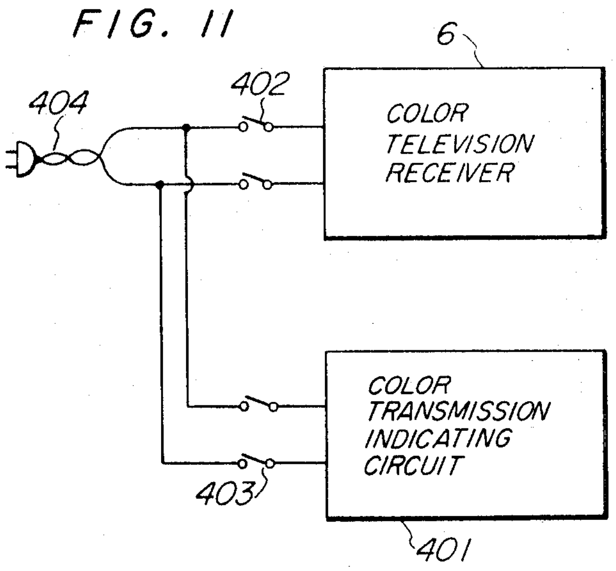
Figure 12:
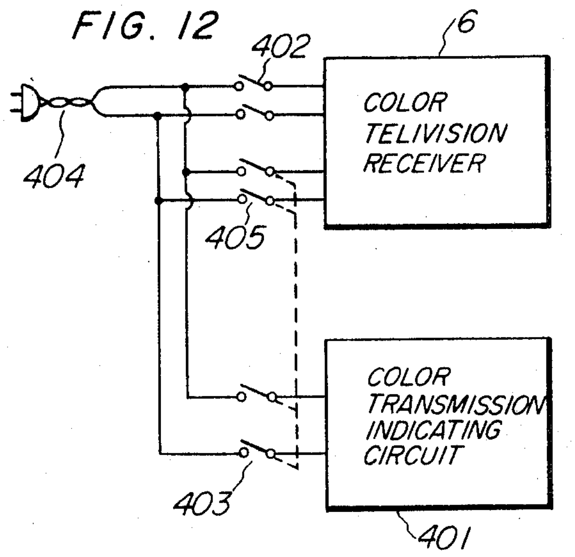

FIGS. 4*a* to 4*e* and 5*a* to 5*d* are views showing waveforms useful for explaining the color television receiver according to the present invention;

FIGS. 6 and 7 are circuit diagrams showing part of the color television receiver according to the present invention;

FIG. 8 is a circuit diagram showing part of the color television receiver according to the present invention;

FIG. 9 is a block diagram showing the color television receiver according to a third embodiment of the present invention;

FIGS. 10*a*, 10*b* and 10*c* are views showing waveforms useful for explaining the receiver shown in FIG. 9;

FIGS. 11 and 12 are circuit diagrams showing fourth and fifth embodiments of the present invention, respectively.

Description will first be made of the principle of the present invention. In addition to an ordinary tuner commonly incorporated in a television receiver, there is provided a separate tuner (referred to as auxiliary tuner hereinafter) of which the tuned frequency and local oscillation frequency are varied with a control voltage which is applied to the resonance capacitors (that is, voltage-dependent capacitors) of the tuning circuit and local oscillator circuit, thereby indicating a station or stations broadcasting color broadcast programs. The aforementioned control voltage applied to the auxiliary tuner is varied with time so that the frequency of each broadcast wave is successively tuned by the auxiliary tuner. Thus, the television broadcast waves in the overall frequency band or a part of it are successively received. The change of the control voltage with time is effected at a predetermined time interval.

When the auxiliary tuner is tuned to a broadcast of a given frequency, the output voltage of the auxiliary tuner is imparted to a circuit adapted to detect whether it is a color broadcast or not (referred to as color transmission detecting circuit), the output of the latter being employed to change the state of a color transmission channel indicating means which is provided separately of a received channel indicating circuit or mechanism which is commonly incorporated in a television receiver. Thus, indication is made of whether the broadcast wave being received represents a color broadcast program or not. The separately provided color transmission channel indicating means referred to hereinabove includes indicator means which is constructed by modifying part or whole of the ordinary received channel indicating means commonly incorporated in a television receiver so as to be provided with such a function as to indicate whether the received broadcast wave represents a color broadcast program or not.

Furthermore, a switching circuit is provided between the color transmission channel indicating means and the color transmission detecting circuit. This switching circuit is so designed as to simultaneously switch the frequency received by the auxiliary tuner and the input circuit of the color transmission channel indicating means. For example, when a frequency of $f_n$ is received, the output of the color transmission detecting circuit is imparted to indicator means which indicates that the frequency is the *n*th. When a frequency of $f_{n+1}$ is received, the output of the color transmission detecting circuit is applied to indicator means which indicates that the frequency is the $(n_+1)$th, and so on. In this way, indication is made with respect to all broadcast waves as to whether they represent color or black-and-white programs. Such indicating operation is repeated at regular time intervals and the indicator means are made to produce integrating action so that the state of indicating that the received broadcast wave represents a color broadcast program may be maintained during a predetermined period of time from the time when a signal indicative of a color program has been supplied thereto for a predetermined short period of time to the time when such signal arrives thereat subsequently. Thus, by repeating the reception of a broadcast wave and the application of a signal indicative of a color broadcast program to the aforementioned indicator means at predetermined time intervals, it is always possible to indicate whether the received broadcast wave represents a color program or a black-and-white one. This is true of all the other broadcast waves. Consequently, during reception of a particular broadcast station, it is possible to indicate which one or ones of all the broadcast stations are transmitting color programs, including the station being presently received.

Here above, description has been made of the case where there is provided an auxiliary tuner separately of the ordinary tuner which is commonly incorporated in a television receiver. In the case of a television receiver of the type that the vertical synchronizing circuit is provided with an AFC function, however, use is made of a circuit arrangement so designed that a received frequency is varied with a control voltage, as a tuner to be incorporated therein; the frequency received by the tuner is successively changed only during the vertical sync signal period, and the voltage of the circuit such as a color killer circuit or the like wherein the voltage is made different between when a color program is received and when a black-and-white program is received is imparted to the indicator means. Thus, it is possible to produce simultaneous display of all broadcast waves as to whether they represent color programs or black-and-white programs, as in the case where use is made of the aforementioned auxiliary tuner.

Figure 1:
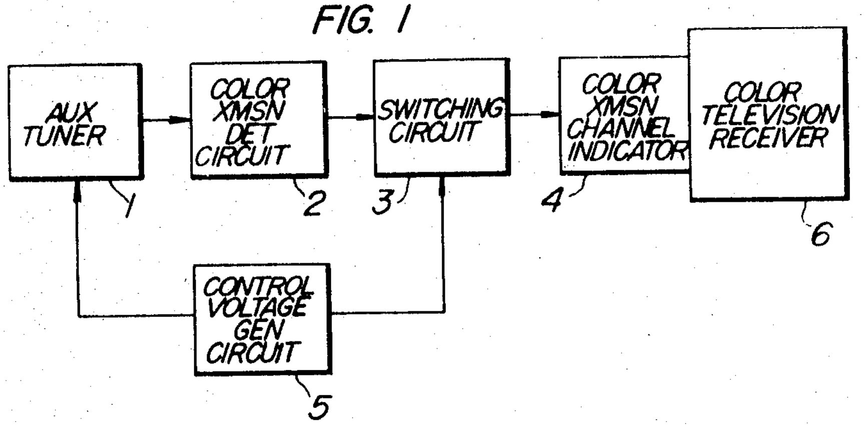
FIG. 1 is a block diagram useful for explaining the technical idea of the color television receiver according to the present invention.
Figure 2:
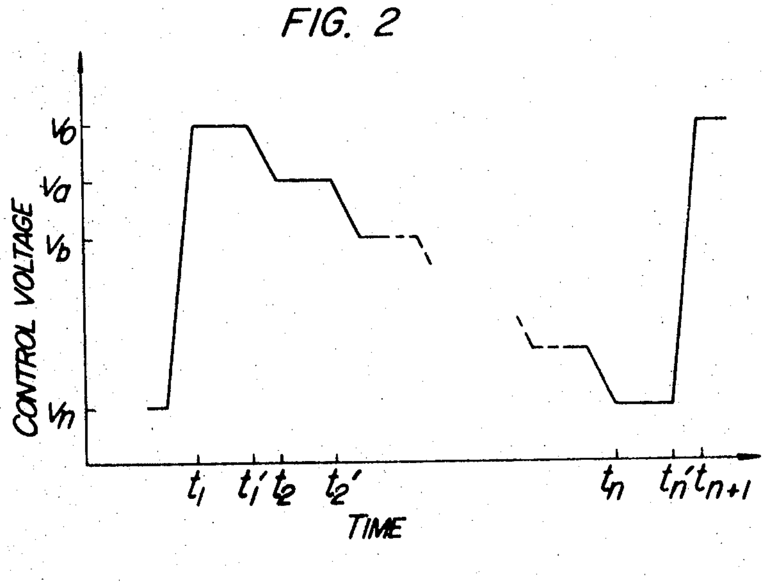
FIG. 2 is a view showing a voltage waveform required for the operation of the present invention.
Figure 3:
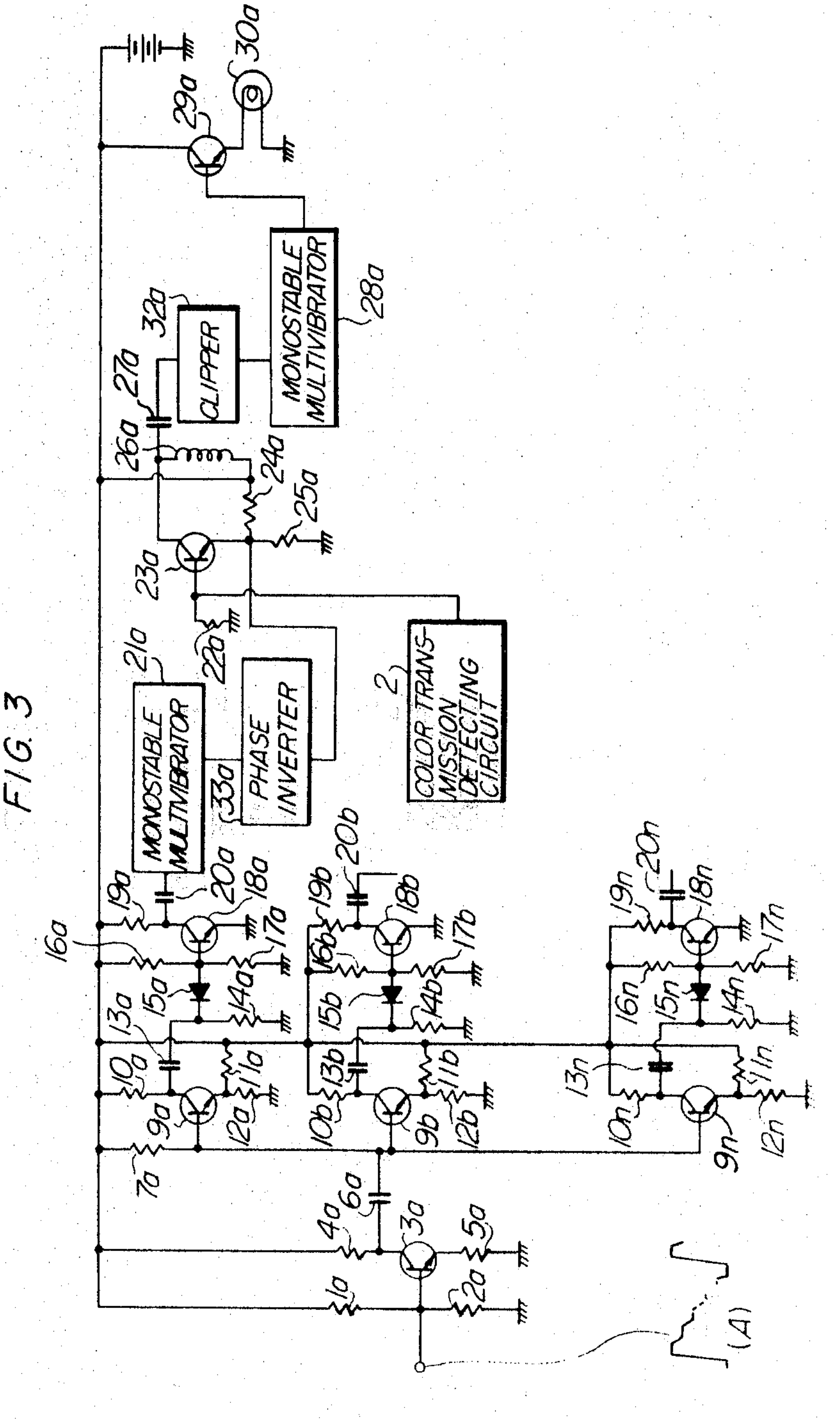
FIG. 3 is a circuit diagram showing the main portion of the color television receiver according to the present invention.
Figures 4A, 4B, 4C, 4D, 4E:
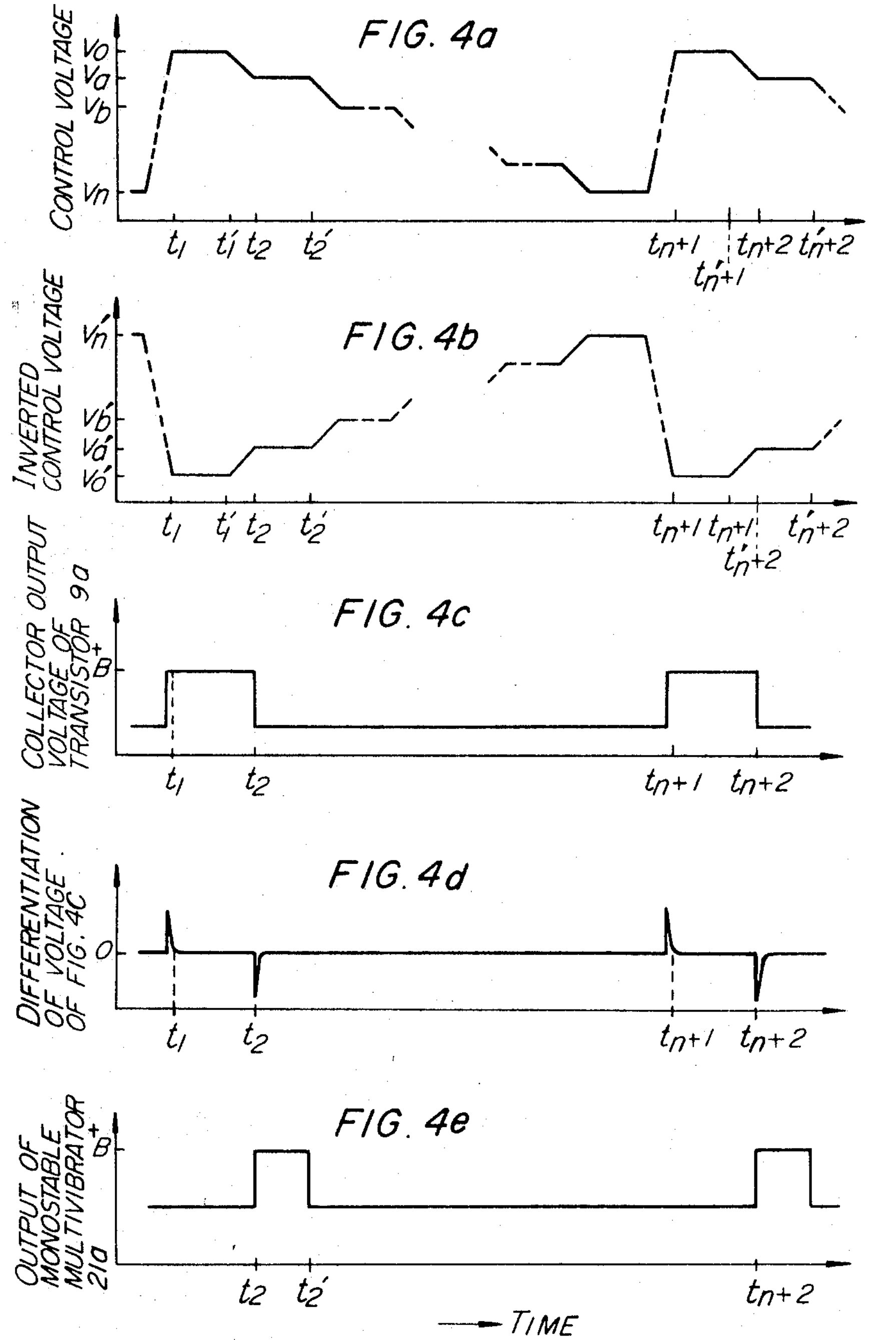
Figure 5A:
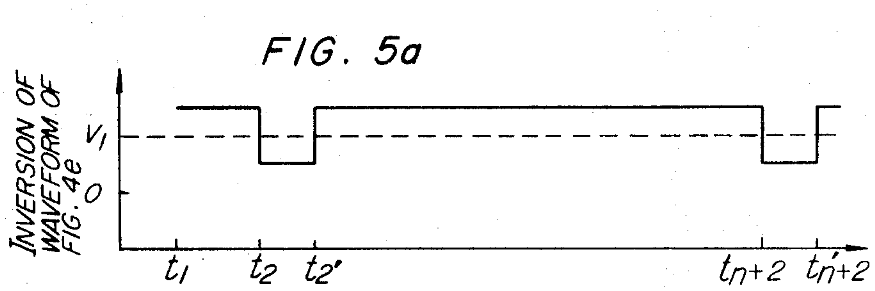
Figure 5B:
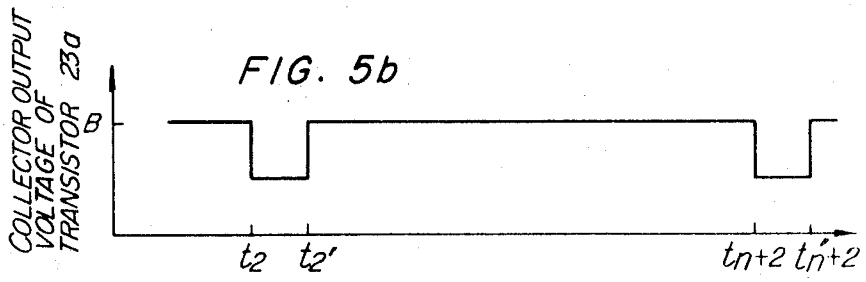
Figure 5C:
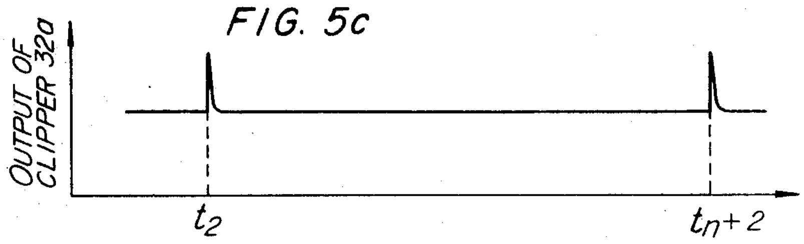

A first embodiment of the present invention will now be described. Referring to FIG. 1, numeral 1 represents an auxiliary tuner which is provided for the purpose of producing a display of color broadcast waves, 2 a color transmission detecting circuit, 3 a switching circuit, 4 a color transmission channel indicator, 5 a control voltage generating circuit, and 6 an ordinary color television receiver. Description will be made of the case where the transmission and reception are effected in the NTSC system. By making the control voltage waveform from the control voltage generating circuit 5 as shown in FIG. 2, the tuner is tuned to a channel *a* at a voltage of $V_a$, to a channel $b$ at a voltage of $V_b$, and to a channel $n$ at a voltage of $V_n$. The operation of the switching circuit will be described with reference to FIG. 3. In FIG. 3, resistors 1*a*, 2*a*, 4*a* and 5*a* and transistor 3*a* constitute a Class A amplifier adapted for reversing the phase of the control voltage waveform shown in FIG. 4*a*. The waveform thus phase-reversed is as shown in FIG. 4*b*, which is passed to the base of pulse generating transistors 9*a*, 9*b*, ....., 9*n* through a capacitor 6*a*. At points of time $t_1$ to $t'_1$, the base of each of the transistors 9*a*, 9*b*, ....., 9*n* is maintained at a voltage of $V'_0$. At these points, the emitters of the respective transistors are so biased with the aid of resistors 11*a* and 12*a*, 11*b* and 12*b*, ..... 11*n* and 12*n* respectively that all of these transistors 9*a*, 9*b*, ....., 9*n* are rendered nonconductive. In order to render only the transistor 9*a* conductive when a voltage $V'_a$ is imparted to the base of each transistor at a point of time $t_2$, the values for the resistors 11*a* and 11*b* are suitably selected, and the emitter bias voltage for the transistor 9*a* is selected to be slightly lower than the voltage $V'_a$. Thus, a rectangular wave in which a voltage drop occurs at the point of time $t_2$ is available at the collector of the transistor 9*a*, as shown in FIG. 4*c*. This voltage drop persists until the base voltage of the transistor 9*a* is rendered nonconductive. Now, by differentiating the waveform shown in FIG. 4*c* by means of a capacitor 13*a* and a resistor 14*a*, there is produced a pulse waveform such as shown in FIG. 4*d*. The positive-going pulses are blocked by a diode 15*a*, passed to so that only the negative-going pulses are passed to the base of a transistor 18*a* so as to be phase-reversed, with a result that positive pulses occur at the collector of the transistor 18*a*. By driving a monostable multivibrator 21*a* by means of the resulting positive pulses, there is obtained such an output waveform as shown in FIG. 4*e*, which is phase-reversed by phase inverter 33*a* and then applied to the emitter of a transistor 23*a*. In this case, the transistor 23*a* is always so biased at the emitter thereof with the aid of resistors 24*a* and 25*a* that it is maintained in the nonconducting state even when the positive voltage $V_1$ available from the color transmission detecting circuit 2 during reception of a color broadcast is applied to the base thereof. Thus, the transistor 23*a* is rendered conductive only when the base voltage thereof assumes a value of $V_1$ during the period between $t_2$ and $t_3$ of a waveform shown in FIG. 5*a* which corresponds to reversal of the voltage waveform shown in FIG. 4*e*. In this way, such a waveform as shown in FIG. 5*b* occurs at the collector of the transistor 23*a*. Then the monostable multivibrator 28*a* is driven by means of a positive pulse waveform (FIG. 5*c*) which is obtained by differentiating the voltage waveform shown in FIG. 5*b*, clipping it by means of diodes incorporated in circuit 32*a* and phase-reversing it by means of a circuit 32*a* as described above. By selecting the quasi-stable period of the monostable multivibrator 28*a* to be sufficiently long, a collector current or emitter current is caused to flow through the transistor (indicated at 29*a* in FIG. 3) being rendered conductive by the output voltage of the multivibrator 28*a*, for a substantial portion of the period from $t_2$ to $t_{n+2}$ (from $t_2$ to $t_{2+x}$ in FIG. 5*d*), whereby a lamp 30*a* is lit. Thus, if the control voltage applied to the auxiliary tuner assumes a particular voltage value so that a corresponding particular broadcast wave is received, this results in the possibility that only the corresponding switching transistor (one of the transistors 23*a*, 23*b*, ....., 23*n* in FIG. 3) is rendered conductive only during reception of a color program so that the frequency tuned by the auxiliary tuner corresponds exactly to that of the channel which is indicated by the indicator circuit (lamp). In back of capacitors 20*b*, ....., 20*n*, too, there are provided circuits similar to the monostable multivibrator 21*a* and succeeding circuits.

A simple example of the control voltage generating circuit 5 will be given. As shown in FIG. 6, a sawtooth wave generating circuit is constituted by a resistor 101, capacitor 102 and diode 103. The diode 103 is adapted so that it is rendered conductive upon application thereto of a voltage in excess of a predetermined voltage, and it may be a silicon AC-controlled diode (commercially available under the trade name of THYDAC), for example. When the capacitor 102 is charged through the resistor 101 up to the voltage at which the diode 103 is rendered conductive, the charge stored at the capacitor 102 is instantaneously discharged so that such a sawtooth waveform as shown at (J) in FIG. 6 is produced across the capacitor 102. The resulting voltage is then divided by resistors 105 and 107. At this point, a base bias is imparted to the base of the transistor 112 with the aid of a resistor 106, and an emitter bias is applied to the emitter thereof with the aid of resistors 110 and 111. Thus, by suitably selecting the values for these resistors, a waveform such as indicated at (K) is produced at the collector of the transistor. The collector voltage which was initially +B voltage begins to decrease due to a buildup of the base voltage and voltage drop resulting from a forward bias applied between the base and emitter. Thereafter, the collector current is saturated so that the voltage drop is ceased. Thus, the voltage waveform such as indicated at (K) is obtained. The circuits constituted by transistors 112*a* and 112*b* are connected in parallel with the transistor 112 and are adapted to produce similar outputs (L) and (M) respectively. That point of the sawtooth wave (J) at which each of the transistors 112, 112*a*, and 112*b* is rendered conductive depends upon a DC bias applied between the base and emitter thereof. Superimposition of (K), (L) and (M) upon each other results in a waveform such as indicated at (N), which is available across the resistor 13. The number of steps of a stepped wave can be increased by increasing the number of stages of the transistor circuit.

Next, description will be made of an example of the color transmission detecting circuit 2. FIG. 7 is a block diagram thereof, wherein numeral 201 represents a video intermediate frequency amplifier, 202 a video detector circuit, 203 a capacitor for blocking DC current, and 204 a transformer adapted for resonating at a frequency equal to that of the subcarrier wave together with a resonant capacitor 205. Numerals 206 and 207 represent resistors for biasing a transistor 209 so that the base thereof is always made to be more negative than the emitter thereof, 208 a bypass capacitor, and 209 a transistor which is adapted to operate in Class B. A capacitor 210 and transformer 211 act as load for the transistor 209, and they constitute a resonance circuit adapted for resonating at the frequency of the subcarrier wave. Numeral 212 denotes a resistor across which a voltage drop is developed during the conduction of the transistor 209, 213 a bypass capacitor, 214 a transistor adapted to produce switching action, 215 and 216 resistors for biasing the transistor 214 in such a manner as to make the emitter potential lower than the base potential, and 217 a load resistor connected with the collector of the transistor 214. If a broadcast wave received by the auxiliary tuner 1 represents a color program, then a color signal is contained in the detection output. This signal component is taken out by the transformer 204 and capacitor 205, and the transistor 209 is rendered conductive only during the positive half period of the signal. Thus, a potential difference is developed across the resistor 212 so that the base potential of the transistor 214 is made to be lower than the emitter potential thereof, resulting in the transistor 214 being rendered conductive. Consequently, a voltage $V_1$ is developed across the resistor 217, and it is applied to the switching circuit 3. On the other hand, if the broadcast wave received by the auxiliary tuner represents a black-and-white program, then no signal appears at the base of the transistor 209 so that the latter is not rendered conductive. Thus, the base of the transistor 214 is maintained at +B so that the transistor 214 remains nonconductive. Therefore, the potential at the collector of the transistor 214 is zero. That is, the output voltage assumes the positive value of $V_1$ during reception of a color program, while during reception of a black-and-white program, the output becomes zero.

Figure 5D:
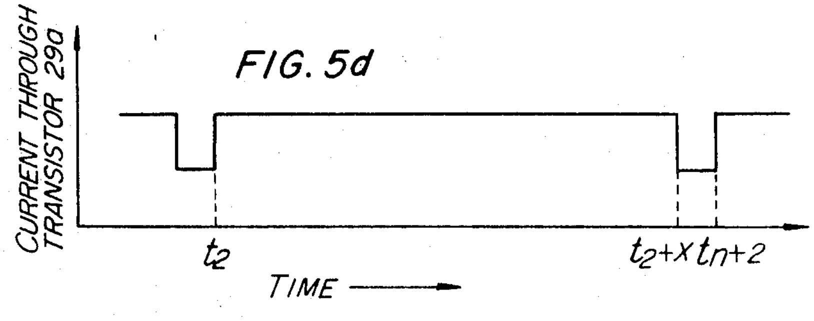

Supplementary explanation will now be made with respect to the indicator circuit. By previously selecting the output waveform of the monostable multivibrator 28*a* as shown in FIG. 5*d*, even if a wave transmitted by a broadcast station $a$ is received only during $\Delta T$ (=$t_1-t_2$) of the repetition period $T$ or the period from $t_1$ to $t_{n+1}$ (this is equal to the period from $t_2$ to $t_{n+2}$), the collector current of the transistor 29a in FIG. 3 is caused to flow for a substantial portion of the repetition period $T$ so that the period of time during which the lamp is lit turns out to be much longer than that during which it is turned off. Thus, it appears to the naked eye as if the lamp were continuously lit. The indicator means using the lamps 30a in FIG. 3 is disadvantageous in that such lamps are of a short life span, that a considerable amount of power is required for lighting them, and that if the number of the lamps is increased, power consumption is increased correspondingly. By using luminescent diodes each formed by GaP or a mixed crystal of GaP and As or the like instead of the lamps as shown in FIG. 8, it is possible to decrease the power consumption and increase the life span. In FIG. 8, 31a, 31b, ....., 31n represent the luminescent diodes respectively, 28b and 28n monostable multivibrators, and 29b and 29n transistors.

Description will now be made of a device adapted for producing simultaneous display of all broadcast waves as to whether they represent color programs or black-and-white programs, by using the tuner originally incorporated in the color television receiver without providing any auxiliary tuner. In the following discussion, the present invention will be described as applied to a color television receiver wherein a frequency to which the tuner is tuned is varied with a control voltage, and the vertical synchronizing circuit is provided with AFC (automatic frequency control) action. Furthermore, it is assumed that in the color television, the vertical synchronization can be normally achieved even if the vertical sync signals are alternately extracted so as to be reduced to 30 per second (at 60 c/s), and that all of the AGC circuit, VIF, video circuit, color signal amplifier circuit, tuner circuit and so forth have such response characteristics that they are normally operated during the occurrence of the vertical sync signals. Referring to FIG. 9, numeral 301 represents a tuner wherein the tuned frequency is varied with a control voltage applied thereto, 302 a video intermediate frequency amplifier circuit, 303 a video detector circuit, 304 video amplifier and output circuits, 305 a trigun type picture tube, 306 an audio circuit, 307 an AGC circuit, 308 a sync separator circuit, 309 a vertical sync output circuit, 310 a horizontal sync output circuit, and 311 a band-pass amplifier for color signals. Numeral 312 also denotes a color signal band-pass amplifier (second stage) to which are applied a color killer voltage and blanking pulses. Numeral 313 indicates a circuit to which flyback pulses are applied for extracting and amplifying only burst signals, 314 a circuit for forming a sub-carrier wave, 315 a color signal demodulator circuit and output circuit, 316 a color killer circuit, 317 a blanking pulse generating circuit, and 318 a circuit for producing a control voltage upon which the frequency received by the tuner 301 depends. Numerals 319, 320, 321, 322 and 323 represent common circuits added to the color television receiver, 323 a circuit adapted for taking out every other vertical sync signal, and 319 a switching circuit which is so designed as to be synchronized with the vertical sync signals to interrupt the output of the control voltage generating circuit 318 only during the period corresponding to every other vertical sync signal and instead supply the output of the control voltage generating circuit 320 (this control voltage will be referred to as auxiliary control voltage) to the tuner 301. The circuit 320 is so designed as to be synchronized with the switching circuit 319 to generate an auxiliary control voltage which is varied at every other vertical sync signal and enables the tuner 301 to be successively tuned to all the broadcast waves that can be received by the tuner during the period corresponding to every other vertical sync signal. The circuit 321 is a circuit for passing the output voltage of the color killer circuit 316 to the indicator circuit 322 with the aid of a mechanical or electronic switch which is adapted to perform switching operation in synchronism with the switching circuit 319. Further, the switching circuit 319 is controlled by the auxiliary control voltage of the circuit 320 so that the output of the color killer circuit is accurately connected with that lamp which indicates the received channel. The circuit 322 is an indicator circuit consisting of the elements 28a, 28b, ....., 28n, 29a, 29b, ....., 29n, 30a, 30b, ....., 30n described above in connection with FIG. 3.

Further detailed description will be made of the case where the present invention is applied to the NTSC system by way of example. For the sake of simplicity, it is assumed that there are only three broadcast waves transmitted by stations *a*, *b* and *c*. Further, it is assumed that the broadcast wave *a* is now received by the color television receiver and that the broadcast wave thus received represents a color program. Still furthermore, it is assumed that the output voltage of the color killer circuit 316 assumes a positive value $V_1$ during reception of a color program while it assumes a value $V_0$ lower than $V_1$ during reception of a black-and-white program. Assuming now that the output voltage of the auxiliary control voltage generating circuit 320 is equal to a voltage $V_b$ for enabling the broadcast wave *b* to be received upon arrival of the vertical sync signal of the broadcast wave *a* at a point of time $t_1$ in FIG. 10a, then the switching circuit 319 is operated to interrupt the output of the circuit 318 at the point of time $t_1$ so that the voltage $V_b$ is imparted to the tuner. Thus, the tuner is tuned to the broadcast wave transmitted by the c *b*. If the broadcast wave transmitted by the station *b* represents a color program, then the output voltage of the color killer circuit assumes the value of $V_1$, which is in turn passed to the indicator circuit 322 through the switching circuit 321, thus indicating that the station *b* is broadcasting a color program. Subsequently, the output of the circuit is again interrupted by the switching circuit 319 at a point of time ($t_1$+2/6) in FIG. 10b, so that a voltage of $V_c$ is passed to the tuner 301. Assuming that the broadcast *c* represents a black-and-white program, when the broadcast wave *c* is received by the tuner 301, the output of the color killer circuit 316 assumes a value of $V_0$, which is passed to the indicator circuit, thus indicating that the station *c* is not transmitting a color program. At a point of time ($t_1$+4/60) in FIG. 10c, the auxiliary control voltage is $V_a$. Since the broadcast wave *a* represents a color program, the indicator means indicates that the station *a* is transmitting a color program. In this way, it is possible to simultaneously indicate that the stations *a* and *b* are transmitting color programs color programs and that the station *c* is transmitting a black-and-white program. By preselecting the conducting period of each monostable multivibrator of the indicator circuit to be equal to a period between $t_1$ and $t_3$ which is slightly shorter than that between $t_1$ and $t_1$+6/60=$t_2$, currents flowing through the lamps indicating that the stations *a* and *b* are transmitting color programs are caused to persist for a substantial portion of the period between $t_1$ and $t_2$, so that it appears to the naked eye as if these lamps were continuously lit. At points of time $t_1$+1/60, $t_1$+3/60 and $t_1$+5/60, the vertical sync signals of the broadcast wave *a* which is received by the color television receiver as the latter is in the normal use are supplied to the vertical sync circuit 309 so that vertical synchronization is maintained in the receiver while the latter reproduces a picture corresponding to the program transmitted by the station *a*. For reference, the output waveforms produced by the respective monostable multivibrators of the indicator circuit are shown in FIG. 10. FIG. 10a shows the output waveform produced by the monostable multivibrator for rendering the transistor conductive for lighting the lamp which indicates the station *b*, FIG. 10b the output waveform produced by the monostable multivibrator corresponding to the station *c*, and FIG. 10c the output waveform produced by the monostable multivibrator corresponding to the station *a*.

Description will now be made of the color transmission indicating device according to the present invention with respect to practical modes of use. One of the modes is such that a separate power source switch 403 for a color transmission indicating circuit 401 is provided as shown in FIG. 11, whereby the color transmission indicating circuit is rendered operative even when the color television receiver is inoperative, thus making it possible to indicate which station or stations are transmitting color programs. Another mode is such that in a color television receiver provided with a preheater means and preheated switch 405, the power source of the color transmission indicating circuit is made to interlock with said preheated switch so that the color transmission indicating circuit is rendered operative when the receiver is in the preheated state, thus, making it possible to indicate a station or stations which are transmitting color programs. The preheater means referred to hereinabove corresponds to the heaters of the receiver to which about a half of the normal voltage is previously applied so as to operate upon closure of the power source switch. In FIG. 12, numeral 402 represents a main power source switch of the receiver, 403 the power source of the color transmission indicating circuit, and 404 a power source cord.

What I claim is:

1. A color television receiver, comprising: a tuner; means varying the tuned frequency of said tuner, including voltage-controlled variable reactance elements; means feeding varying control signals to said tuner to vary said tuned frequency successively and repeatedly at a predetermined cycle, including control voltage generating means generating successively and repeatedly varying control voltages; transmission discriminating means discriminating between color broadcast wave signals and black-and-white broadcast wave signals being received at said tuner and generating "1" and "0" signals alternately at the output of said discriminating means; switching means comprising a plurality of switching elements connected to said control voltage generating means and said transmission discriminating means, and enabled by a logical product of the control voltage of said control voltage generating means and the output voltage of said transmission discriminating means; and indicator means connected with said plurality of switching elements and generating a signal during the conduction of each of said switching elements.

2. A color television receiver according to claim 1, wherein said tuner comprises an auxiliary tuner distinct from primary tuner incorporated into said receiver.

3. A color television receiver according to claim 1, further comprising means applying every other vertical sync signal period as the vertical sync signal period of a displayed broadcast signal; means applying the remaining sync signal period as the period for measuring nondisplayed broadcast signals; and means deriving a color transmission detecting signal from said nondisplayed broadcast signals received during said measuring period.

4. A color television receiver according to claim 1, further comprising means varying said tuned frequency with an externally applied DC voltage control signal, wherein said control signal comprises a stepped waveform.

5. A color television receiver according to claim 4, wherein said plurality of switching elements comprises a plurality of transistors; and further comprising means applying the signal generated by said discriminating means to the inputs of said transistors; means applying a voltage of a predetermined level of said control signal to the emitters of said transistors in synchronism with a channel switching operation of said tuner; and means causing at least one of said transistors to which said signals generated by said discriminating means and said predetermined level of said control signal are applied to conduct.

6. A color television receiver according to claim 4, further comprising means applying a sawtooth wave to the inputs of said transistors; wherein said stepped waveform control voltage generating means comprises a plurality of transistors connected in parallel; and wherein the saturation points of said transistors with respect to said input sawtooth wave differ from each other whereby the outputs of said transistors are superimposed on each other.

7. A color television receiver according to claim 1, wherein said indicating means comprises luminescent diodes.

8. A color television receiver according to claim 1, further comprising a further power source applied to said tuner, discriminating means, switching means and indicating means independently of the power source for said receiver.

9. A color television receiver according to claim 8, further comprising preheater means disposed in said receiver; switch means controlling said preheater means; and means interlocking said preheater switch means and said further power source.

10. A color television receiver according to claim 1, wherein monostable multivibrators are inserted between the output terminals of the respective switching elements and the indicator means and the period of the output voltage of said monostable multivibrators is approximately equal to the channel selecting period of the plurality of broadcast waves.

UNITED STATES PATENT OFFICE

CERTIFICATE OF CORRECTION

Patent No. 3,591,708 Dated July 6, 1971

Inventor(s) Masayoshi HIRASHIMA

It is certified that error appears in the above-identified patent and that said Letters Patent are hereby corrected as shown below:

1. Instead of the "Matsurhita Electric Industrial Co., Ltd.", the Assignee should read --MATSUSHITA ELECTRIC INDUSTRIAL CO., LTD.--

2. Japanese Patent Application N° 84108/68 filed November 13,1968 should be included in the claim for Convention Priority.

3. Two Japanese Utility Model Appln. Nos. should read --44/994-- and --44/995-- instead of "43/994" and "43/995".

Signed and sealed this 25th day of January 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334